United States Patent
Vaquero Gonzalez et al.

(10) Patent No.: US 10,027,632 B2
(45) Date of Patent: Jul. 17, 2018

(54) DATA VIEW BASED ON CONTEXT (71) Applicant: Hewlett Packard Enterprise Development LP, Houston, TX (US)

(72) Inventors: Luis Miguel Vaquero Gonzalez, Bristol (GB); Suksant Sae Lor, Bristol (GB); Marco Casassa Mont, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 147 days.

(21) Appl. No.: 14/905,422

(22) PCT Filed: Jul. 26, 2013

(86) PCT No.: PCT/US2013/052337
§ 371 (c)(1),
(2) Date: Jan. 15, 2016

(87) PCT Pub. No.: WO2015/012867
PCT Pub. Date: Jan. 29, 2015

(65) Prior Publication Data
US 2016/0182462 A1    Jun. 23, 2016

(51) Int. Cl.
  *H04L 29/06* (2006.01)
  *G06F 17/00* (2006.01)
  *G06F 21/62* (2013.01)
  *H04L 9/06* (2006.01)

(52) U.S. Cl.
CPC .......... *H04L 63/0428* (2013.01); *G06F 17/00* (2013.01); *G06F 21/62* (2013.01); *G06F 21/6227* (2013.01); *H04L 9/0618* (2013.01); *H04L 2209/24* (2013.01)

(58) Field of Classification Search
CPC .................................................... H04L 63/0428
See application file for complete search history.

(56) References Cited

U.S. PATENT DOCUMENTS

| 7,085,385 | B2 * | 8/2006 | Frantz ................. H04L 63/0442 380/277 |
| 8,275,850 | B2 | 9/2012 | Kohan et al. |
| 2002/0107842 | A1 | 8/2002 | Biebesheimer et al. |

(Continued)

FOREIGN PATENT DOCUMENTS

| CN | 1496627 A | 5/2004 |
| CN | 1535515 A | 10/2004 |

(Continued)

OTHER PUBLICATIONS

ISO, "Pad 3: Block Ciphers," Dec. 15, 2010, pp. 1-86, ISO/IEC 18033-3:2010(E), Second Edition.

(Continued)

*Primary Examiner* — Shawnchoy Rahman
(74) *Attorney, Agent, or Firm* — Hewlett Packard Enterprise Patent Department (57) ABSTRACT

In an implementation, a view of a set of data may be based on a context. The context may include an attribute associated with an attribute list. A set of symbols may be associated with the attribute list and the set of data. A key may be associated with the attribute list and a function list.

13 Claims, 4 Drawing Sheets

(56) References Cited

U.S. PATENT DOCUMENTS

| | | | |
|---|---|---|---|
| 2006/0117271 A1* | 6/2006 | Keim | G06F 3/0489 715/789 |
| 2006/0236369 A1 | 10/2006 | Covington et al. | |
| 2007/0006321 A1 | 1/2007 | Bantz et al. | |
| 2008/0201350 A1 | 8/2008 | Thattil | |
| 2008/0275880 A1 | 11/2008 | Bird et al. | |
| 2011/0001999 A1 | 1/2011 | Nanaumi | |
| 2011/0246498 A1 | 10/2011 | Foster | |
| 2011/0251887 A1 | 10/2011 | Paul et al. | |
| 2011/0296187 A1 | 12/2011 | Bisso et al. | |
| 2011/0321117 A1 | 12/2011 | Nestler et al. | |
| 2012/0087494 A1 | 4/2012 | Spalka et al. | |
| 2012/0144210 A1 | 6/2012 | Yacobi | |
| 2012/0155634 A1 | 6/2012 | Baughman | |
| 2013/0019173 A1 | 1/2013 | Kotler et al. | |
| 2013/0111544 A1 | 5/2013 | Balinsky et al. | |
| 2013/0114810 A1 | 5/2013 | Kobayashi et al. | |
| 2013/0172021 A1* | 7/2013 | Karmarkar | H04M 1/72547 455/457 |
| 2014/0283100 A1* | 9/2014 | Harrison | G06F 21/6245 726/26 |

FOREIGN PATENT DOCUMENTS

| | | |
|---|---|---|
| CN | 101242274 A | 8/2008 |
| CN | 101292246 A | 10/2008 |
| CN | 101371490 A | 2/2009 |
| CN | 102055759 A | 5/2011 |
| CN | 102099812 A | 6/2011 |
| CN | 102236766 A | 11/2011 |
| CN | 102594555 A | 7/2012 |
| CN | 103080932 A | 5/2013 |

OTHER PUBLICATIONS

Haiping Lu et al., "Face Recognition with Biometric Encryption for Privacy-Enhancing Self-Exclusion," Jul. 2009, pp. 1-8, University of Toronto, Canada, Available at: <pdfs.semanticsholar.org.c81b/7258e5471f1d3ca8611d4c3623e29cea2925a.pdf>.

Dan Boneh et al., "Functional Encryption: Definitions and Challenges," 2011, pp. 1-24, Available at: <eprint.iacr.org/2010/543.pdf>.

Amit Sahai and Brent Waters, "Fuzzy Identity-Based Encryption," 2005, pp. 1-15, Available at: <eprint.iacr.org/2004/086.pdf>.

RSA Laboratories, "RSA Laboratories. PKCS #1: RSA Cryptography Standard," Oct. 27, 2012, pp. 1-63, EMC Corporation, Available at: <emc.com/collateral/white-papers/h11300-pkcs-1v2-v-rsa-cryptography-standard-wp.pdf>.

Vipul Goyal et al., "Attribute-Based Encryption for Fine-Grained Access Control of Encrypted Data," 2006, pp. 1-28, Available at: <eprint.iacr.org/2006/309.pdf>.

International Search Report & Written Opinion, dated Jun. 3, 2014, PCT Patent Application No. PCT/US2013/052337, 9 pages.

Lewko, A., et al., Fully Secure Functional Encryption: Attribute-based Encryption and (hierarchical) Inner Product Encryption, < http://eprint.iacr.org/2010/110.pdf >, Dec. 26, 2011, 56 pages.

Extended European Search Report, EP Application No. 13889831.7, dated Nov. 29, 2016, pp. 1-10, EPO.

\* cited by examiner

DATA VIEW BASED ON CONTEXT

BACKGROUND

Computer users may transmit data to one another across a network and/or over the Internet. Computer users may commonly want to limit the availability of transmitted data to specific parties. One method of limitation may include providing the data to a specific group of users. For example, websites may commonly apply policies to determine the availability of data to groups of users. Another method of limitation may include securing the data. Encryption methods, such as public-key encryption, are commonly used to secure the data from third parties by providing a key to a user. Access limitations and data view restrictions may increase as data becomes more publically available or otherwise accessible.

DETAILED DESCRIPTION

Introduction

In the following description and figures, some example implementations of systems and/or methods for communication of a set of data are described. Data may be available to recipients based on a policy and/or based on a key for decoding the information. Users may have access to data based on their attributes, such as by an attribute-based encryption method. For example, membership in a certain group of an online community may have access to data for that specific group. Some data may be publically available or otherwise accessible to users who are not the intended recipients. Commonly, a user with a correct key may decrypt the entirety of a file or transmission. If a third party does not have the key, they may be unable to read the data. However, sometimes an originally intended recipient, may no longer be authorized to view the data. For example, a former employee may continue to access and otherwise view an encrypted customer list because the private key possessed by the employee continues to decrypt the data once the employee has left the company.

Various examples described below provide a flexible encoding that provides a view of the encoded data based on a policy and an attribute of a user. A communication architecture that references a dynamic list of functions and attributes may allow for security protocols to change and dynamically customize accessibility and interpretability of the data without having to reissue a key.

The following description is broken into sections. The first, labeled "Environment," describes examples of computer and network environments in which various examples for communication of a set of data may be implemented. The second, labeled "Components," describes examples of physical and logical components for implementing various examples. The third section, labeled "Operation," describes example methods to implement various examples for communication of a set of data.

Environment

Figure 1:
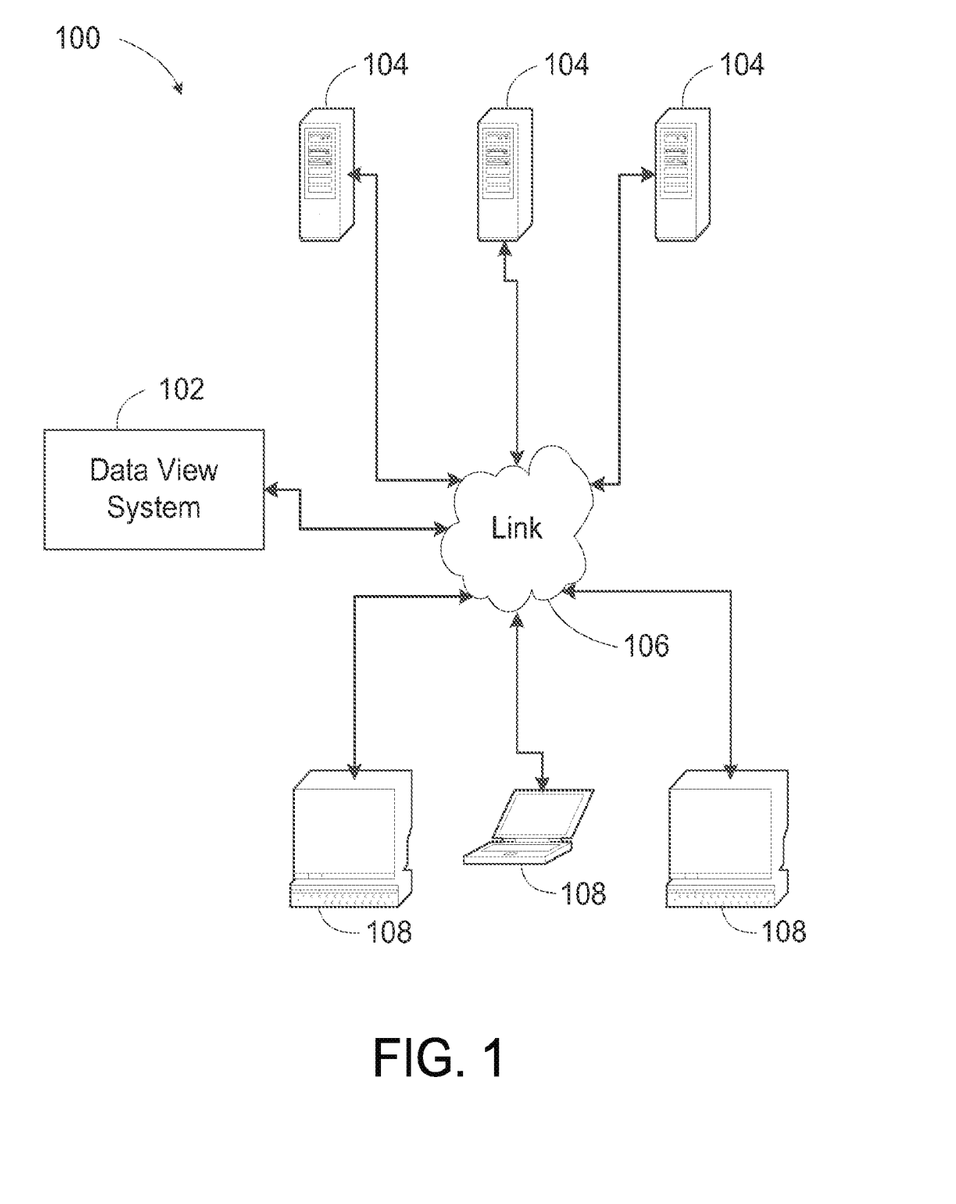
FIG. 1 depicts an example environment in which various examples for communication of a set of data.

FIG. 1 depicts an example environment 100 in which various examples may be implemented. The environment 100 is shown to include a data view system 102. The data view system 102 described below with respect to FIGS. 2 and 3, may represent generally any combination of hardware and programming configured to communicate a set of data. The data view system 102 may be integrated into a server device 104 or a client device 108. The data view system 102 may be distributed across server devices 104, client devices 108, or a combination of server devices 104 and client devices 108. Server devices 104 may include any network device and client devices 108 may include any computer and/or peripheral device.

In the example of FIG. 1, a client device 108 may access a server device 104. The server devices 104 may represent generally any computing devices configured to respond to a network request received from the client device 108. A server device 104 may include a web server, an application sewer, or a data server. The client devices 108 may represent generally any computing devices configured with browsers or other applications to communicate such requests and receive and/or process the corresponding responses. A link 106 may represent generally one or any combination of a cable, wireless, fiber optic, or remote connections via a telecommunications link, an infrared link, a radio frequency link, or any other connectors of systems that provide electronic communication. The link 106 may include, at least in part, intranet, the internet, or a combination of both. The link 106 may also include intermediate proxies, routers, switches, load balancers, and the like.

Components

Figure 2:
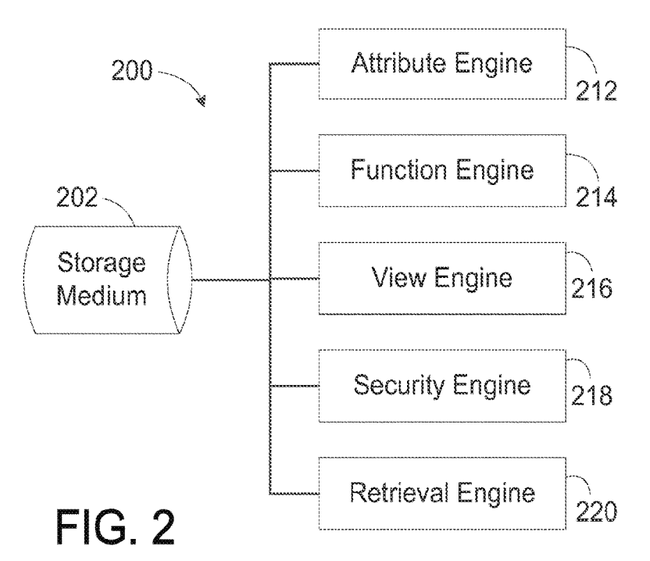
FIGS. 2 and 3 are block diagrams depicting example systems for communication of a set of data.
Figure 3:
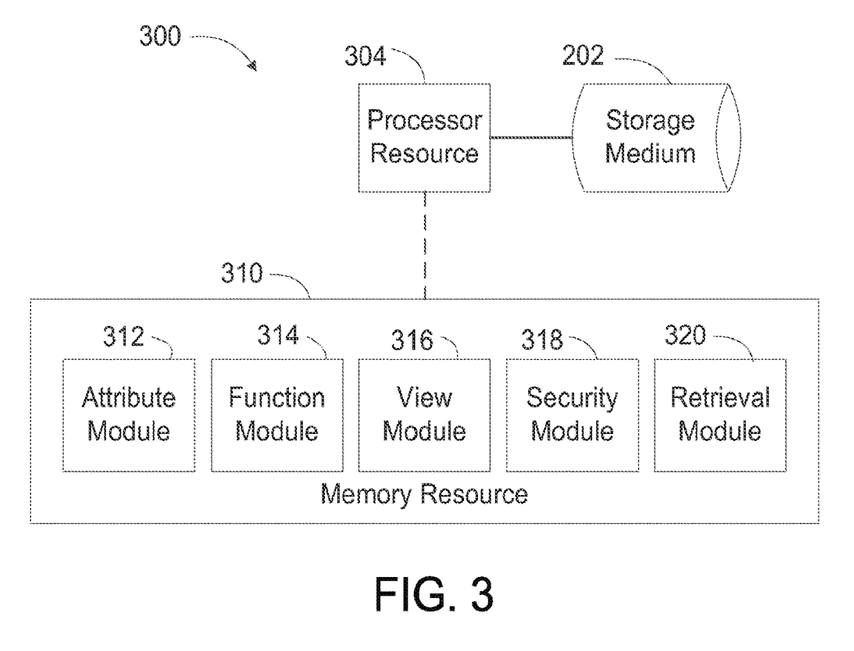

FIGS. 2 and 3 depict examples of physical and logical components for implementing various examples. FIG. 2 depicts an example of the data view system 200 that may generally include a storage medium 202, an attribute engine 212, a function engine 214, and a view engine 216. The example data view system 200 may also include a security engine 218 and a retrieval engine 220.

The attribute engine 212 may represent any combination of hardware and programming configured to maintain an attribute list. The attribute engine 212 may maintain and/or determine the attribute list based on at least one of a context, a key, and a set of symbols. The attribute list may contain an attribute. An attribute may be a characteristic, value, label, summarization, analysis, setting, or any other property of a user, a profile, a system, a device, and/or other environment of a context. For example, an attribute may include a set of data of a website user profile, a facial feature, an image property, a phone number, an address or other location, a preference or setting, or any other set of data or modification to the set, of data that may be available to the data view system 200, whether public or private. The attribute may be any attribute usable by attribute-based encryption methods, such as membership in a group or the age of a user. The attribute may be represented by any data structure capable of representing a property of a context mentioned above. For example, the attribute may be a set of data contained in a Boolean structure, integer structure, string structure, array structure, list structure, queue structure, and/or any other data structure to store and/or communicate an attribute. The attribute list may be any data structure capable of containing an attribute, a reference to an attribute, and/or information regarding an attribute. For example, the attribute list may be an array, an integer, linked list, or other data structure capable of providing attribute information.

The attribute engine 212 may maintain an attribute list that may change dynamically based on a context. The context may include at least one of a global attribute, a source attribute associated with a communication source, and a destination attribute associated with the communication destination. An attribute may include an attribute associated with the source of the communication, the destination of the communication, a third party to the communication, or otherwise related to the communication. For example, the attribute may be a property of the source or security information of the data view system 200. The context may be a portion or any combination of a source context, a destination context, and a global context. The context may include information related to an attribute, a function, an environment, and/or a policy, such as security information, a constraint threshold or range, an environment tolerance, a list modification, function hierarchy information, access structure information, and/or meta-data related to that, information. A global attribute may be an attribute associated with a system, a communication, and/or a policy that may be separable from the context of the source or the context of the destination. A global attribute may be an attribute that may be associated with both the source context, and the destination context. For example, an attribute of the source or the destination may also be an attribute of the system, the environment, the policy, or otherwise part of the global context. An attribute associated with a third party and an attribute otherwise related to the communication are examples of global attributes. Other examples of global attributes include a time stamp, a system configuration, a server capacity, a server load, or any other attribute not directly associated with a source or destination or may be an attribute that is associated with both a source and a destination. The context of the source or the destination may include data to contain in the attribute list, to compare against an attribute of the attribute list, or may otherwise be associated with the attribute list. For example, the source context may include a source attribute associated with the source and the destination context may include a destination attribute associated with the destination. The context may include a global attribute that may be directly related, indirectly related, or unrelated to either the source or the destination, such as time, communication method, parental settings, or attributes of a third party. An attribute, the attribute list, and/or a context may be stored in a storage medium, such as computer readable storage medium that may allow for the attribute, the attribute list, and/or the context to change.

The attribute list may change dynamically based on the context. The attribute list may change by adding, removing, modifying, or otherwise maintaining the attribute list. The attribute list may change dynamically when a change in the context is reflected by a change in the attribute list. For example, the attribute list may change as the source context changes and/or where the source decides to add an attribute to the list. The attribute list may be updated as an attribute changes, based on an execution of a process or function, or on a scheduled interval. The attribute list may change dynamically based on at least one of a global context, a source context and a destination context. For example, a file that uses the same access level as the creator may have an attribute list, that is updated to top secret after the creator changes to a top secret classification. The attribute list may reference the attributes of the context to allow the attribute list to change dynamically as the context changes. For example, a reference to the attribute list may be passed to a function that utilizes the attribute list to make a comparison. The attribute list may change depending on its contents. The attribute list may contain keywords to verify against a source, destination, or global attribute. For example, the attribute list may include a general attribute of hair color. The attribute list may contain specific attributes related to a context. For example, the attribute list may contain an attribute of red hair color.

A reference to the attribute list may allow for binding of the attribute and data associated with the attribute to happen at the time of communication of the set of data and/or the time the a set of data is requested to view. Binding the attribute list may refer to the state of the data representing the attribute list when it may no longer change. Attributes may be bound early, for example, at the time encrypting a set of data, or later, when the data is requested to be viewed. Early binding, such as at the time of encryption, may allow destinations or users who no longer fit the policy requirements to view the data and those who have met the requirements after the time of encryption to not be able to view the data. Binding the attributes of the attribute list at the time of execution of the system, process, or request to view, rather than at the time of compiling, may be referred to as late-binding. Such late-binding of this information allows for dynamic and flexible security policies and for real-time updates of the attribute list as the context changes. For example, an attribute may be added to or removed from the attribute list at any time and the data view system 200 may utilize the attribute list in the state at the time of execution of the system, execution of the process, request to view the data, or any other time where the state of the attribute list is receivable by the data view system 200.

The function engine 214 may represent any combination of hardware and programming configured to maintain a function list having a function to apply on at least one entry of the attribute list. The function engine 214 may maintain and/or determine the function list based on at least one of a context, a key, and a set of symbols. The function list may be any data structure capable of containing a function, a reference to a function, and/or information regarding a function. For example, the function list may be an array, an integer, linked list, or other data structure capable of providing function information. The function applied may be any function capable of determining availability and/or viewability of the data according to a policy. The function may be a comparison operation, a verification operation, an analysis operation, a security operation, or any other operation, or combination of operations, performable on an attribute to facilitate a policy. For example, the function list may contain a verification function, such as "isgroupmember( )," to verify the user is a member of a group that may access the set of data. For another example, the function list may contain a function to compare the age of the user to a reference age, such as an age of maturity or 18 years of age. The function may support a boolean comparison, a complex operation on an attribute list, or any arbitrary operation for making determinations using a context. The function may include any function useable with functional encryption methods. The function may be directly or indirectly related to an entry in the attribute list. The relationship between the function and the attribute may be reasonable for security determinations. For example, it may be reasonable to determine if the user is mature enough based on the attribute of age or the attribute of level of education, but it may not be reasonable to determine maturity based on hair color. The function may be related to a global attribute. For example, a time limit may be placed on availability of the data and the function may make a comparison to the current time or a timestamp. A function and/or a function list may be stored on a storage medium, such as a computer readable medium, that, may allow for the function and/or the function list to change.

The function list may change dynamically based on the context. The function list may change dynamically by adding a function, removing a function, modifying a function, or otherwise maintaining the function list. For example, the source may decide to change the function applied from comparing the attribute age to 18 years of age to 21 years of age or from comparing age to comparing group membership. The function list may be updated as a function changes, based on an execution of a process or function, or on a scheduled interval. A reference to the function list may allow for binding of the functions performed on an attribute to happen at the time of communication of the set of data and/or the time the set of data is requested to view. For example, a reference to the function list may be passed to an access structure. The reference may allow for real-time policy determinations.

Context information, such as the attribute list and attribute used by the data view system 200 may be stored on the storage medium 202. Policy information, such as the function list and the access structure, may be stored on the storage medium 202. The storage medium 202 may be located on a sewer device, a client device, or distributed across any combination of sewer devices and client devices.

The view engine 216 may represent any combination of hardware and programming configured to generate a view of the set of data. The view engine 216 may determine the view based on an attribute and a function according to a context and a policy. For example, the view engine 216 may determine a redacted, blurry, or otherwise partial view of the data may be made available based on the context. The view may be determined based on additional attributes and additional functions according to the context, and the policy. The view engine 216 may receive the attribute list from the attribute engine 212 and the function list, from the function engine 214. The view engine 216 may generate the view from the set of symbols based on the function and the attribute.

A view may be any version, portion, and/or modification of a set of data, as well as the set of data in the original form or equivalent. For example, the set of data may be a color image, and the views of the set of data may include a pixelated version of the image, a partially blurred version of the image, the image with persons removed, a black-and-white version, a portion of the image, and the original color image. The set of data may be an image, text document, electronic file, network transmission, or any other information capable of being contained in an electronic form.

The policy may be a rule, a procedure, or a compilation of rules and/or procedures of a community, system, and/or environment. The policy may be mapped onto a set of functions, attributes, and views. The policy may dictate what function, attribute, and view may be admissible at any specified time. For example, the policy may dictate the use of specific encryption forms, a limited exchange of information with a client device, a password minimum and maximum length, and a request may be from a destination having a close, personal relationship with the source of the set of data. For another example, if the set of data is an image, the policy may constrain the attribute to be based on a picture taken from a web camera, the function to make a facial feature comparison, and the view to be an image. In that example, the policy may restrain the data view system 200 from generating a view based on a user name or credit card number or from generating a color version of the image. The policy for viewing the data may be based on the context of the user requesting access to the set of data. For example, a document uploaded to a user group may be encoded with a view policy that allows registered users of the user group to view the set of data in the original format.

The policy may include flexible levels of availability and viewability based on context. For example, the set of data may be viewable in multiple formats and the format retrievable by the data view system 200 may be based on the context of a user. The context of a user may include attributes of the user making the request, the user who encoded the data, a global attribute, or a system attribute. Examples of context may include personal attributes of the user requesting the set of data, time stamps or limits, location, and internet protocol address. User attributes may include any discoverable or accessible data associated with a user, such as name, address, height, weight, hair color, group membership, search or browser history, personal identifiable numbers, or any other personal identifiable information, whether confidential or public. The data view system 200 may retrieve attributes and/or other context information from the user or another source. The context and policy, or a part thereof, may be encoded or referenced to in a set of symbols, a key, and/or another source accessible by the data view system 200.

The set of data may have multiple views based on predetermined viewing formats and/or settings. The set of data may have multiple views based on modifications or alterations to the original set of data or a predetermined view that may be different from the original set of data. For example, the set of data may be a set of images encoded with several formats based on resolution. Modifications may be individualized to the type of data being requested for view based on the policy. For example, if the set of data is an image, the view of the data may be a modification of color, sharpness, contrast, size, or other image attribute. The multiple views may be combined and/or contained in the set of data. For example, a photographer may provide views of their photographs based on a policy, where the views are combined into a set of data and/or symbols, and provide, from the set of data and/or symbols, thumbnail versions to the public, mid-sized black-and-white versions to registered users, and full-sized color versions to the persons in the photographs.

The view engine 216 may receive a set of symbols, a key, an attribute list from the attribute engine 212, and a function list from the function engine 214. The view engine 216 or a processor resource, such as processor resource 304 in FIG. 3, may make requests to receive the input data, such as the key, the attribute list, and the function list. The view engine 216 may generate a view from the set of symbols based on a function of the function list and an attribute of the attribute list. The key may be associated with the set of symbols, the attribute list, and the function list. The key may be provided by the security engine 218 based on a public-key encryption architecture, as discussed below.

The view engine 216 may be configured to determine the view of the set of data based on an access structure. The access structure may be associated with the policy. The access structure may include the function of the function list to apply on an entry of the attribute list. The entry of the attribute list may be an attribute of the global context, the source context, and/or destination context. The access structure may include conditional functions and/or programming, including the function of the function list, to determine the view to generate. The access structure may be any structure compatible with programming architecture such as an array, linked list, binary tree, etc. The access structure may be accessible or provided by the key or a remote server. The access structure may represent any combination of hardware and programming configured to execute a view policy.

The view may be combined into the set of data or otherwise contained in the set, of data. The view may be one of a set, of views combined into the set of data and/or a set of symbols. The view engine 216 may be configured to select one of the set of views and/or modify a view. For example, the view engine 216 may at least one of select the view based on the context, which may include a first function applied on an attribute, and apply a second function onto at least one of the set of data and the view of the set of data. The second function may modify the view based on the context. The access structure may include functions and/or modifications to the set of data to generate a view or modify a selected view according to a policy.

The security engine 218 may represent any combination of hardware and programming configured to secure or otherwise encode the set of data. For example, the security engine 218 may be configured to generate the set of symbols based on the attribute list and an encoding applied to the set of data. The set of symbols may be generated from an encoding applied to the set of data. An encoding may include encryption, use of a cipher, or other symbol association by dictionary, mathematical operation, or other modification to input data, such as the set of data associated with the view generated by the view engine 216. For example, the set of data may be encrypted with the Advanced Encryption Standard ("AES") to generate a set of symbols. The security engine 218 may access a library containing a set of encoding methods, such as encryption methods, to select a security method based on a security setting. For example, the security setting may be high and the security engine 218 may select a cipher based on a complex mathematical operation. A key may decode the set of symbols. For example, the set of symbols may be decryptable using a key. The security engine 218 may use a public-key cryptography method where the user may be in possession of a private key associated with the user.

The security engine 218 may be configured to generate the key based on at least one of the attribute list, the function list, and the set of symbols. The key may be associated with the attribute engine 212 and/or the function engine 214. For example, the key may have references to the attribute list and/or the function list. The key may be configured to retrieve an attribute from the attribute list and/or a function form the function list. For example, the key may have references to the attribute list and the function list or may have a function that requests access to a server containing the attribute list and the function list.

The retrieval engine 220 may represent any combination of hardware and programming configured to comprising a retrieval engine 220 to retrieve at least one of the context, the attribute list, and the function list from at least one of a server device, a client device, and an interface device. The retrieval engine 220 may retrieve information based on requests from a processor resource, such as processor resource 304 in FIG. 3, and/or the engines 212, 214, 216, and 218 of the data view system 200.

The engines 212, 214, 216, 218, and 220, the storage medium 202, and the processor resource 304, of FIG. 3 may be distributed across any combination of server devices, client devices, peripheral devices, network devices, or other devices in communication with the data view system 200. For example, the client device may request a view of an image, a first server device may receive the data, a second server device may decode the data using a key from the client device, a third server device may modify the image to show in black and white, and a fourth server device may provide the black-and-white view to the client device. The devices described above may be physical, virtual, or a hybrid of physical and virtual. The engine 212, 214, 216, 218, and 220 may complete or assist completion of an operation discussed in reference to another engine 212, 214, 216, 218, and 220. The engines 212, 214, 216, 218, and 220 may communicate, interact, or otherwise be operatively coupled in any combination to form a work flow capable of performing the operations of the data view system 200. For example, the retrieval engine 220 may use the function engine 214 and the security engine 218 may decode the information retrieved by the retrieval engine 220, perform functions on the information before sending the information to the view engine 216, and perform functions upon receiving the view from the view engine 216 before making the view available.

FIG. 3 depicts the data view system 300 may be implemented on a memory resource 310 operatively coupled to a processor resource 304. The processor resource 304 may be operatively coupled to the storage medium 202. The processor resource 304 may be operatively coupled to the memory resource 310 and the memory resource 310 may contain a set of instructions. The processor resource 304 may carry out the set of instructions to receive the context, a key, and a set of symbols associated with the set of data. The processor resource 304 may carry out the set of instructions to complete or assist completion of an operation discussed in reference to the engines 212, 214, 216, 218, and 220 above. For example, the processor resource 304 may carry out the set of instructions to determine the view of the set of data based on an access structure and that determination may be sent to the view engine 216, shown in FIG. 2. As another example, the processor resource 304 may request the attribute list from the attribute engine 212 based on at least one of the context, the key, and the set of symbols, request the function list from the function engine 214 based on at least one of the context and the key, and the view engine 216 may generate the view from the set of symbols based on the function and the attribute. The storage medium 202 and the memory resource 310 may be representations of a computer readable medium and may be representations of the same computer readable medium.

In the example of FIG. 3, the data view system 300 may include a memory resource 310 containing an attribute module 312, a function module 314, and a view module 316. The memory resource 310 may also include a security module 318, and a retrieval module 320. The memory resource 310 may contain a set of instructions to be carried out by the processor resource 304. The processor resource 304 may carry out the set of instructions to execute the attribute module 312, the function module 314, the view module 316, the security module 318, and the retrieval module 320, and/or any operations between or otherwise associated with the modules of the data view system 300.

The attribute module 312 may be configured to maintain an attribute list. The attribute list may include an entry associated with an attribute. The attribute list may generally include characteristics of a context, which may include a source context, destination context, and/or a global context. For example, the context characteristics may include attributes of the user requesting view or other attributes described herein. Context and attributes may be determined at the time of request for view. For example, the attribute module 312 may receive a picture taken form a camera interfaced with the system to take a picture of the user of the system at the time of the request. The attribute module 312 may interact with the storage medium 202 to maintain the attribute list. The attribute module 312 may maintain and/or determine the attribute list based on at least one of the context, the key, and the set of symbols.

The function module 314 may be configured to maintain a function list. A policy of the data view system 300 may be represented by the function list. The policy may be a constraint or set of constraints that consider the system configurations or limits, context, security, and possible functions associated with viewing a set of data. The function list, may represent the policy by providing the functions that determine who, what, and how the data may be viewed.

The function list may be associated with an access structure. For example, the access structure may be a binary tree where a path to a node of the tree is determined by applying a function of the function list to an attribute of the attribute list. An additional function may be determined as a result of the previous function. For example, a function may allow the access structure to be traversed to a point in the access structure that may provide a view.

The attribute list and the function list to facilitate policy determinations. For example, the function module 314 may apply a user verification policy to a set of picture data taken from a camera where the user verification function(s) compare known attributes of the user to the set of picture data, such as hair color, wears glasses, etc. The function module 314 may include a policy to determine a view based on the context. For example, if the user verification policy above made multiple feature comparisons of the user and the set of picture data passed the hair color, skin color, and eye distance comparisons, but not the wears-glasses comparison, the policy may determine the request may produce a distorted version of the set of data or a magnified version of the set of data, where a version, or view, of the data may be a portion of the data. The function module 314 may interact with the storage medium 202 to maintain the function list. The function module 314 may maintain and/or determine the function list based on at least one of the context and the key.

The view module 316 may be configured to generate a view of a set of data. The view may be determined by the policy and the context which may provide for a flexible, dynamic viewability of a set of data. The view module 316 may generate a view of the set of data based on a set of symbols, a key, an attribute list, and a function list. For example, the view module 316 may receive a set of symbols, may decode the set of symbols using the key, and determine a view of the decoded data based on applying a function of the function list to an attribute of the attribute list. The view engine 316 may interact with the security module 318 to facilitate decoding of the set of symbols based on the key, as discussed below. The view module 316 may be configured to at least one of select a format of the set of data and modify the format of the set of data. For example, if the security engine 318 decoded a set of symbols to generate the set of data and the set of data contains a plurality of views, the view module 316 may determine the view to generate based on a function and an attribute. The view module 316 may determine the view based on a function and an attribute in accordance with a policy of the data view system 300. For example, the policy may determine that when the user is an older family member that requested a picture, the view module 316 may select the full-size version of the picture and apply a sepia color modification to the picture. For another example, the request for a picture may originate from a group member under the age of 18 that is not directly connected to a person in the picture and a landscape view of the set of data may be generated, where the persons in the picture are blurred or removed from the picture. The view module 316 may request an attribute list from the attribute engine 312 based on at least one of the context, the key, and the set of symbols. The view module 316 may request a function list from the function engine 314 based on at least one of the context and the key. The view engine 316 may generate a view from the set of symbols based on the function and the attribute.

The security module 318 may be configured to encode a set of data. The security module 318 may encode the set of data using a cipher to produce a set of symbols, or ciphertext, associated with the set of data. The security module 318 may access an encoding library that may contain a set of encryption operations, such as Rivest Shamir Adleman ("RSA") cipher.

The retrieval module 320 may be configured to retrieve at least one of a set of data, a set of symbols, a key, a function list, and an attribute list from at least one of a server device, a client, device, and an interface device. For example, the retrieval module 320 may include instructions to obtain a set of camera data from a camera interfaced or otherwise in communication with the data view system 300.

The processor resource 304 may be one or multiple central processing units ("CPU") capable of retrieving instructions from the memory resource 310 and executing those instructions. The processor resource 304 may process the instructions serially, concurrently, or in partial concurrence, in accordance with the description herein.

The memory resource 310 and the storage medium 202 may represent a medium to store data utilized by the data view system 300. The medium may be any non-transitory medium or combination of non-transitory mediums able to electronically store data and/or capable of storing the modules of the data view system 300. The medium may be machine-readable, such as computer-readable. The data of the storage medium 210 may include representations of electronic files, such as network logs, word processing documents, and digital photographs.

In the discussion herein, engines 212, 214, 216, 218, and 220 and modules 312, 314, 316, 318, and 320 have been described as combinations of hardware and programming. Such components may be implemented in a number of fashions. Looking at FIG. 3, the programming may be processor executable instructions stored on the memory resource 310, which is a tangible, non-transitory computer readable storage medium, and the hardware may include processor resource 304 for executing those instructions. The processor resource 304, for example, may include one or multiple processors. Such multiple processors may be integrated in a single device or distributed across devices. For example, the processor resource 304 may be distributed across any combination of server devices, client devices, and interface devices. Memory resource 310 may be said to store program instructions that when executed by processor resource 304 implements the data view system 300 in FIG. 3. Memory resource 310 may be integrated in the same device as processor resource 304 or it may be separate but accessible to that device and processor resource 304. The memory resource 310 may be distributed across any combination of devices. For example, the memory resource 310 may be distributed across server device, client devices, and interface devices.

In one example, the program instructions can be part of an installation package that when installed may be executed by processor resource 304 to implement the system 300. In this case, memory resource 310 may be a portable medium such as a CD, DVD, or flash drive or memory maintained by a server device from which the installation package may be downloaded and installed. In another example, the program instructions may be part of an application or applications already installed. Here, the memory resource 310 may include integrated memory such as a hard drive, solid state drive, or the like.

In FIG. 3, the executable program instructions stored in memory resource 310 may be represented as the attribute module 312, the function module 314, the view module 316, the security module 318, and the retrieval module 320 that when executed by the processor resource 304 may implement the data view system 300. The attribute module 312 may represent program instructions that when executed function as an attribute engine 212. The function module 314 may represent program instructions that when executed function as a function engine 214. The view module 318 may represent program instructions that when executed may function as a view engine 216. The security module 318 may represent program instructions that when executed function as a security engine 218. The retrieval module 320 may represent program instructions that when executed function as a security engine 220. The engines 212, 214, 216, 218, and 220 and/or the modules 312, 314, 316, 318, and 320 may be distributed across any combination of server devices, client devices, and storage mediums.

Operation

FIGS. 4-7 are flow diagrams depicting example methods for communication of a set of data. In discussing FIGS. 4-7, reference may be made to elements and diagrams of FIGS. 1-3 to provide contextual examples. Implementation, however, is not limited to those examples.

Figure 4:
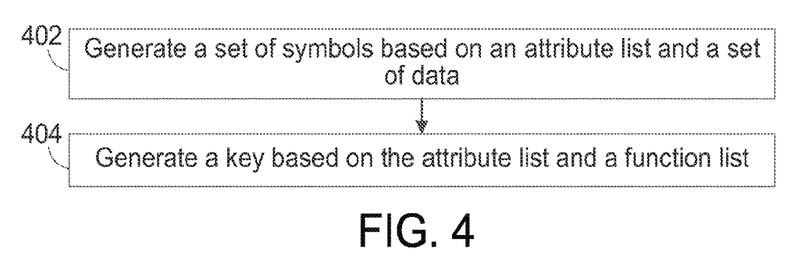
FIGS. 4-7 are flow diagrams depicting example methods for communication of a set of data.

Referring to FIG. 4, an example method for communicating a set of data may include preparation of the set of data to be viewed. In block 402, a set of symbols may be generated based on an attribute list and the set of data. The attribute list may have an attribute. The attribute may be associated with a context and may include an attribute of a source, a destination, and/or a system. The attribute list may change dynamically based on the context. For example, if a destination is a user and that user leaves a social group, that user may no longer have the attribute of being a member of the social group. The set of symbols may include a reference associated with the attribute list.

A context, an attribute list, and/or a function list may change dynamically. A change may be any addition, removal, substitution, transfer, conversion, or other modification of the context, an attribute, a function, and/or other information related to the data view system. The change may be dynamic if the change is any form of a modification described above based on another modification or the passage of time. For example, as a user changes their profile, the data view system may update to include the change in an attribute related to the user profile. Dynamic change may include real-time changes, or any method to keep the attribute list up-to-date with in an acceptable threshold. The threshold may be based on an availability of the data, a quantity of user requests, a sync rate, or a load capacity. For example, if the data view system included a policy of allowing a single view within a 5 minute time period, then an update schedule of every 4 minutes and 59 seconds may be within the acceptable threshold. A real-time change may be a change that happens in reaction to another change as rapidly as possible or within a tolerance defined by user, system, or process limitations, such as a website refresh rate, processor execution rate, or a perceived rate where a first change and a second change may be perceived to happen concurrently. A real-time change may be facilitated by using a reference to a set of data rather than using a copy of the set of data. Adaptations, or changes, to the attribute list may be made as changes occur in the source, destination, or global context. Similar to the attribute list, the function list may also adapt to changes in real-time or a delayed fashion, such as by scheduled syncing.

In block 404, a key associated with the set of symbols may be generated based on the attribute list and a function list. The function list may have a function to apply on an attribute of the attribute list to determine a view of the set of data. The function list may change dynamically based on context. For example, the source may determine the policy for deciding viewability of the data has changed from, at the time of sending the set of symbols, being based on social group membership to being based on age at the time of requesting to view the set of data associated with the set of symbols. The key may include a reference associated with the function list.

Figure 5:
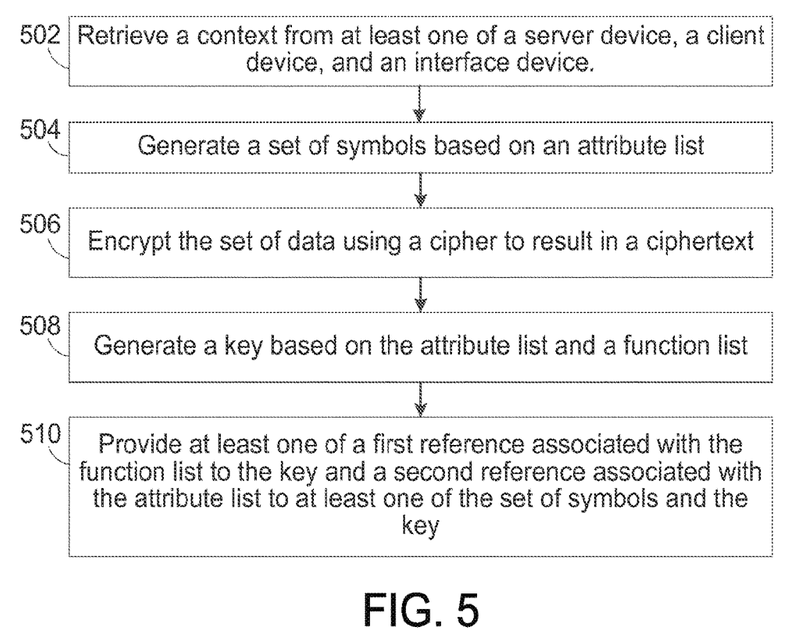

Referring to FIG. 5, the description associated with blocks 402 and 404 may be applied to blocks 504 and 508 respectively.

In block 502, a context may be retrieved from at least one of a server device, a client device, and an interface device. The context, may include a set of attributes and other information associated with the communication of the set of data. A server device may include a web server, application server, data server, or other network device. A client device may include a device requesting to view the data. Examples of client devices include cell phones, laptops, desktops, and mobile devices. An interface device may include any device capable of providing input and/or output to the client device, server device, or network, such as a computer, a keyboard, a network analyzer, or a camera.

In block 506, the set of data may be encrypted using a cipher to generate a cipher text. The cipher may be at least one of a plurality of ciphers of a cipher list. The cipher list, or cipher library, may contain functions and/or references to functions to encrypt the set of data. The cipher may be selected based on the context. For example, the system at the destination may be able to decrypt AES encryption so the system may decide to encrypt the set of data using an AES encryption.

In block 510, a first reference associated with the function list may be provided to the key. A second reference associated with the attribute list may be provided to at least one of the set of symbols and the key. The key may access the function list through the first reference and the attribute list through the second reference.

Figure 6:
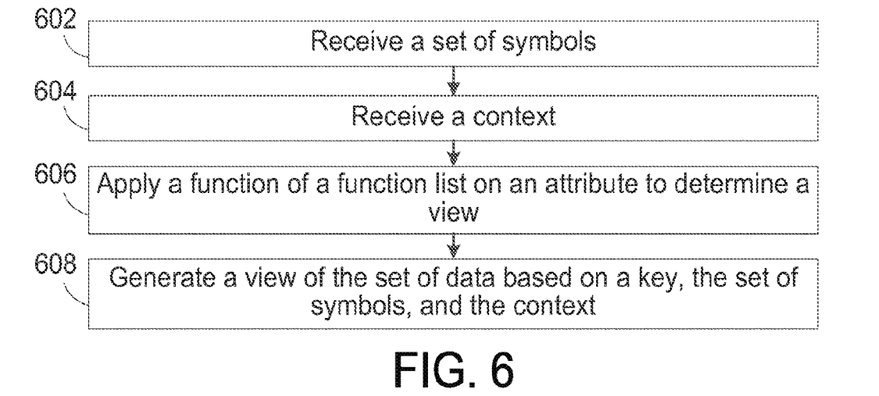

FIG. 6 depicts an example method for communication of a set of data. In block 602, a set of symbols may be received. The set of symbols may be associated with an attribute list and the set of data. A key may also be received and may be associated with the attribute list, a function list, and the set of symbols.

In block 604, a context may be received. The context may include an attribute. The attribute may be associated with a source, a destination, a system and/or global information.

In block 606, a function of a function list may be applied on the attribute to determine a view. The function list may contain a function to apply on an attribute of the context. The view to generate may be determined by that function. For example, a user at the destination system may be under a predetermined age and the function may determine that a landscape view may be generated where the persons are blurred or removed from the picture. The function list may change dynamically based on a context. For example, the source of the communication may decide to change the policy and use a different function to administer that policy.

In block 608, a view of the set of data may be generated a based on the key, the set of symbols, and the context. The key may be associated with a function to apply on the attribute. For example, the key may include a reference to a function or a function list.

Figure 7:
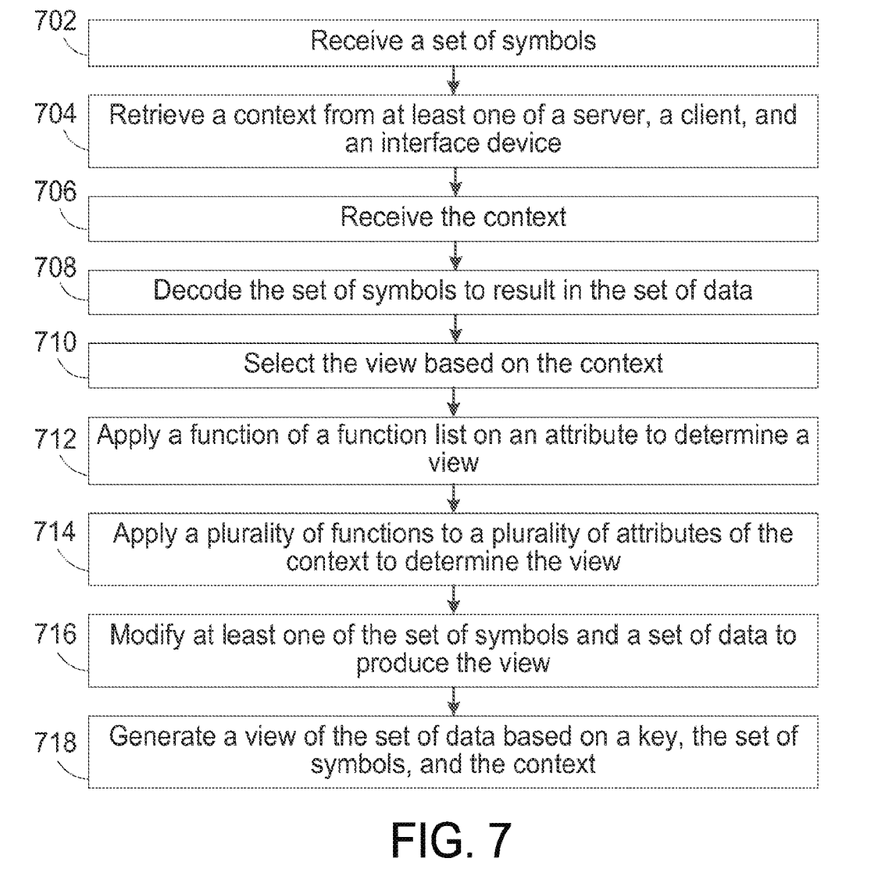

Referring to FIG. 7, the description associated with blocks 602, 604, 606 and 608 may be applied to blocks 702, 706, 710, and 718 respectively.

In block 704, a context may be retrieved from at least one of a server device, a client device, and an interface device. The context may include a set of attributes and other information associated with the communication of the set of data. A server device may include a web server, an application server, a data server, or a network device. A client device may include a device requesting to view the data. Examples of client devices may include laptops, desktops, and mobile devices. An interface device may include any device capable of providing input and/or output to the client device, server device, or network, such as a computer, a keyboard, a network analyzer, or a camera.

In block 708, the set of symbols may be decoded to generate the set of data. Decoding the set of data may include decrypting the set of symbols based on a decryption operation associated with a key. The decoding of the set of symbols may generate a set of data that may contain a view. For example, the set of data may be a raw image without any modifications to it. The set of data may include a plurality of views of the data. For example, the set of data may include a plurality of images of a raw image based on size and resolution.

In block 710, a view may be selected based on the context. The set of data may contain the view. For example, the view may be part of the set of data decoded from the set of symbols. The set of symbols may be an encrypted version of a set of data that included multiple views, or formats, of the set of data. For example, the set of data may contain a plurality of views and the view may be selected from the plurality of views based on the context.

In block 714, a plurality of function may be applied to a plurality of attributes of the context to determine the view. For example, the policy may include a check of the context for membership in a group, a role in the group, and age to determine the view. In general, the flexible policy may use more than one comparison of attributes to determine the view. The plurality of functions may be included in a function list and/or an access structure. The plurality of functions and/or access structure may be retrievable from a client device, server device, or other storage medium.

In block 716, at least one of the set a modification function may operate on the view once accessibility has been determined, such as by successful decryption. The modification function may customize the set of data to a particular user and/or context or may continue to secure a portion of the data in a manner, such as blurring, redacting, or resizing. The modification may be done on a portion of the data or ail of the data in either an encrypted state or unencrypted state.

CONCLUSION

FIGS. 1-3 depict architecture, functionality, and operation of various examples. In particular, FIGS. 2 and 3 depict various physical and logical components. Various components are defined at least in part as programs or programming. Each such component, portion thereof, or various combinations thereof may represent in whole or in part a module segment or portion of code that comprises an executable instruction that may implement any specified logical function(s) independently or in conjunction with additional executable instructions. Each component or various combinations thereof may represent a circuit or a number of interconnected circuits to implement the specified logical function(s).

Examples can be realized in any computer-readable medium for use by or in connection with an instruction execution system such as a computer/processor based system or an Application Specific Integrated Circuit ("ASIC") or other system that can fetch or obtain the logic from the computer-readable medium and execute the instructions contained therein. "Computer-readable medium" may be any individual medium or distinct media that may contain, store, or maintain a set of instructions and data for use by or in connection with the instruction execution system. A computer readable storage medium may comprise any one or combination of many physical, non-transitory media such as, for example, electronic, magnetic, optical, electromagnetic, or semiconductor media. Specific examples of computer-readable medium may include, but are not limited to, a portable magnetic computer diskette such as hard drives, solid state drives, random access memory ("RAM"), read-only memory ("ROM"), erasable programmable ROM, flash drives, and portable compact discs.

Although the flow diagrams of FIGS. 4-7 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present, invention.

The present description has been shown and described with reference to the foregoing examples. It is understood, however, that, other forms, details, and examples may be made without departing from the spirit and scope of the invention that is defined in the following claims.

What is claimed is:

1. A system for communication of a set of data comprising:
   an attribute engine to maintain an attribute list, the attribute list to change dynamically based on a context, the context including at least one of a global attribute, a source attribute associated with a source, and a destination attribute associated with the destination;
   a function engine to maintain a function list having a function to apply on at least one entry of the attribute list, the function list to change dynamically based on the context;
   a view engine to generate a view of the set of data; and
   a security engine to:
      generate a set of symbols based on the attribute list and an encoding applied to the set of data, and
      generate a key based on at least one of the attribute list, the function list, and the set of symbols;
   a processor resource operatively coupled to a computer readable storage medium, wherein the computer readable storage medium contains a set of instructions, the processor resource to carry out the set of instructions to:

receive the context, the key, and the set of symbols associated with the set of data, the key associated with the set of symbols, the attribute list, and the function list; and request the attribute list from the attribute engine based on at least one of the context, the key, and the set of symbols; and request the function list from the function engine based on at least one of the context and the key, the view engine to generate the view from the set of symbols based on the function and the attribute.

2. The system of claim 1, wherein the view engine determines the view of the set of data based on an access structure, the access structure including the function of the function list to apply on an entry of the attribute list.

3. The system of claim 1, wherein the set of data contains the view, the view engine to at least one of:

select the view based on a first function and the attribute; and apply a second function onto at least one of the set of data and the view, the second function to modify the view based on the first function and the attribute.

4. The system of claim 1, comprising a retrieval engine to retrieve at least one of the context, the attribute list, and the function list from at least one of a server device, a client device, and an interface device.

5. A method for communication of a set of data comprising:

generating a set of symbols based on an attribute list and the set of data, the attribute list to have an attribute and to change dynamically based on a context; and generating a key based on the attribute list and a function list, the key to decode the set of symbols and the function list to have a function to apply on the attribute of the attribute list to determine a view of the set of data and to change dynamically based on the context; and providing at least one of a first reference associated with the function list to the key and a second reference associated with the attribute list to at least one of the set of symbols and the key.

6. The method of claim 5, comprising encrypting the set of data using a cipher to generate a ciphertext.

7. The method of claim 6, wherein the cipher is at least one of a plurality of ciphers of a cipher list, the cipher to be selected based on the context and the context to include security information.

8. The method of claim 5, comprising retrieving the context from at least one of a server device, a client device, and an interface device.

9. A method for communication of a set of data comprising:

receiving a set of symbols, the set of symbols associated with an attribute list and the set of data, the attribute list to change dynamically based on a context;

receiving the context, the context including an attribute;

applying a function of a function list on the attribute to determine a view, the function list to change dynamically based on a context;

generating the view of the set of data based on the key, the set of symbols, and the context, the key associated with the function to apply on the attribute; and receiving at least one of a first reference associated with the function list to the key and a second reference associated with the attribute list to at least one of the set of symbols and the key.

10. The method of claim 9, comprising:

decoding the set of symbols to generate the set of data, the set of data to contain the view; and selecting the view based on the context.

11. The method of claim 9, comprising applying a plurality of functions to a plurality of attributes of the context to determine the view.

12. The method of claim 9, comprising modifying at least one of the set of symbols and the set of data to produce the view.

13. The method of claim 9, comprising retrieving the context from at least one of a server device, a client device, and an interface device.

* * * * *